(12) United States Patent
Evans

(10) Patent No.: US 6,430,708 B1
(45) Date of Patent: Aug. 6, 2002

(54) METHOD AND APPARATUS FOR TESTING JOB CONTROL LANGUAGE (JCL) MEMBERS

(75) Inventor: William R. Evans, San Mateo, CA (US)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 09/293,361

(22) Filed: Apr. 16, 1999

Related U.S. Application Data

(60) Provisional application No. 60/068,196, filed on Apr. 17, 1998.

(51) Int. Cl.[7] .................................................. G06F 11/36
(52) U.S. Cl. ........................................... 714/38; 714/25
(58) Field of Search ..................... 714/38, 25; 709/101; 707/200; 717/1, 4

(56) References Cited

U.S. PATENT DOCUMENTS 3,905,023 A * 9/1975 Perpiglia
5,115,392 A * 5/1992 Takamoto et al.
6,055,368 A * 4/2000 Kunioka

* cited by examiner

*Primary Examiner*—Gopal C. Ray
(74) *Attorney, Agent, or Firm*—Beyer Weaver & Thomas LLP

(57) ABSTRACT

Automated generation of a test scenario or environment for testing control programs in a batch computing environment uses various input to produce test libraries, referenced control files, and parameters with reduced manual intervention. User-specified overrides and key specifications are used to customize a test scenario in which the test scenario is based on production control programs, procedures, and parameters. One of the input to the generation tool is a control program list containing the names of control programs that to be tested. Custom characteristics of the test scenario or environment are also specified and entered into the generation tool. It is also determined whether any of the procedures called by the control programs need to be modified. The custom characteristics are incorporated into the control programs and modifications are incorporated into the procedures called by the control programs.

33 Claims, 12 Drawing Sheets

METHOD AND APPARATUS FOR TESTING JOB CONTROL LANGUAGE (JCL) MEMBERS

CROSS-REFERENCE TO RELATED APPLICATION

This application claims the benefit of U.S. Provisional Application No. 60/068,196, filed Apr. 17, 1998, which is incorporated herein by reference in its entirety.

BACKGROUND OF THE INVENTION

1. Field of the Invention

The present invention relates generally to computer software for testing programs in a large computing environment. More particularly, the invention relates to techniques for automatically generating a test environment that reflects changes or additions made to a production environment.

2. Discussion of Related Art

In complex batch-processing computing environments, typically performed on mainframe computers in large enterprises, testing and maintenance of programs that run in the "real-world" business environment, known as production, have to be performed frequently and reliably. For example, if one program is changed, each of the batch-processing jobs that call that program would likely have to be tested. Furthermore, each batch-processing job might have to be tested for many reasons including year 2000 compliance, user interface, and financial accuracy.

Errors or mishaps in production affecting actual business data can have serious technical ramifications which, more importantly, can lead to adverse business consequences. Not only do production programs and modules need to be tested often, but also because of the large and occasionally enormous processing load, management and maintenance of the testing environment is itself a significant task requiring much time and effort. Even with well-staffed testing and quality assurance teams at many organizations, the testing process is still error-prone, mainly because it is still manually intensive despite some degree of automation.

FIG. 1 is a block diagram comparing production and test environment components as is well known in the field of software testing in a batch processing environment. A production computer 100 has access to various production data storage areas containing various programs and data. The program and data of primary interest here are the production Job Control Language (JCL) programs, referred to as members, 102 and production data files 104. JCL members 102, also referred to as jobs, are programs that control the management of data files and the execution of programs, such as COBOL or DB2 programs, comprising the batch processing on the production computer. As is known in the art of computer programming, the JCL programming language, originally developed by the IBM Corporation, is used to control the flow of program execution in a batch processing environment, such as in IBM's MVS operating system. Batch processing in the MVS environment typically runs on mainframe computers and involve hundreds or thousands of batch programs. JCL members and batch processing are tools and techniques well known in the computer field, specifically the field of mainframe computing.

Production data files 104 are data files that contain actual data used in production, these files may be flagged as production files by, for example, beginning with the letter "P". These data files can include, for example, database files containing production data. The letter "P" is also used to distinguish JCL members and other production-side data as production items. Updates to production data must only reflect actual business transactions. Also associated with production computer 100 are data storage areas for production "PROCs" or procedures 106 and production "PARMs" 108. PROCs are essentially subroutines called by JCL members 102. PARMs are used by JCL members and production programs (i.e., the actual data processing programs whose execution is controlled by the JCL members) to set runtime parameters.

A test environment includes a test computer 110, typically another mainframe computer in the batch processing context. Test computer 110 also has various data storage areas that generally mirror data storage areas on the production side. One of the data storage areas contains test JCL members 112 and test data files 114. The files can include control and historical files, as well as input files. The test data and programs in these storage areas may be distinguished from production data and programs, e.g., by placing an indicator such as the letter "T" at the beginning of each data file and program name. Another data storage area holds test PARMs 116 used by test JCL members that are somewhat different from production PARMs 108. Because the test JCL members do not perform in exactly the same manner as the production JCL members, the test programs normally do not use production PARMs 108. However, test JCL members 112 can use production PROCs 106.

FIG. 2 is a flow diagram showing a process of manually creating a test environment from a production environment as is known in the art. At step 202 production JCL members 102 that are to be tested are copied from a controlled production library into a tester-controlled library (e.g., a tester's private library) or test group-shared library. Also copied are the production PROCs needed to test the JCL members. At step 204 changes and overrides are made to the copies of the production JCL members to reference the desired test environment. This typically involves changing library concatenations to suit the particular test being performed (e.g., ensuring that they point to appropriate test modules). The overrides are generally made to PROC parameters so that they reference the desired test environment. This step is manually intensive since it involves examining each PROC that is called by the JCL, determining which PROC parameters can be overridden in the JCL and editing those values. This needs to be done for each test run. It is generally an error-prone and time consuming process.

At step 206 the tester must examine the test JCL to check the input and output data files used by the test JCL. Proprietary tools can be used to scan the test JCL and provide a report of referenced files (referenced files can be hidden in the programs and thus are not easily detectable by a human tester). The tester may need to scan the report to make sure the test JCL members point to the right data files. The tester must also check for any other errors in the test JCL which typically involves manually scanning the JCL members. This step is also manually intensive and requires significant effort and attentiveness on the part of the tester to catch errors.

At step 208 the tester determines whether any corrections or overrides are needed for the test JCL after examining the programs at step 206. If corrections or overrides are required, they are made at step 210. At this step the tester generally builds any missing files needed by the test JCL and makes any overrides to the data sets. If no corrections or overrides are needed, the tester places the test JCL in a user-controlled library for execution on the test computer.

The test JCL is now in condition to be used for the actual testing of the production JCL copied at step 202. Up until this point, all the steps were needed simply to prepare the JCL members for actual testing.

In addition, there is presently no completely automatic process for keeping files and programs up to date (i.e., consistent with current programs and files that are being tested). This still has to be done manually by the tester. Once in the user-controlled library, testing the JCL will require access to a JCL or job scheduler which contains the flow or order in which the JCL members (of which there can be hundreds) will execute. Presently, there are no tools that can provide the tester with a visual representation of the job flow for the particular test being performed.

One attempt to automate the process of preparing test JCL involves using "skeleton" JCL members. These programs contain symbolics in place of actual variable names which are substituted with variables or other data during execution. The symbolics are programmatically converted to variables. Typically there are many skeletons of a JCL member or program where each skeleton can be used in a different test thereby enabling rapid population of test JCL members and allowing many tests using the same JCL member to run at the same time. However, skeleton programs still have to be maintained in so far that changes in production JCL members still have to be reflected in the skeleton program.

Therefore, it would be desirable to automate the process of generating a test environment for testing JCL in which all necessary checks and adjustments required to ensure that the test JCL members run properly are done with reduced human intervention. In addition, it would be desirable to have JCL generated in such a way that similar test environments are logically subdivided. Furthermore, it would be desirable to generate and schematically display job flow diagrams so that testers can view a particular job flow for the test being performed.

SUMMARY OF THE INVENTION

To achieve the foregoing, methods, apparatus, and computer readable media are disclosed which provide automated generation of a JCL test scenario in a batch computing environment. In one aspect of the invention, a method of automatically generating a test environment for testing control programs in a batch computing environment is disclosed. A control program list containing the names of control programs that have been added or modified and need to be tested is created. Custom characteristics of the test scenario or environment are specified. It is determined whether any of the procedures called by the control programs needs to be modified. The custom characteristics are incorporated into the control programs and modifications are incorporated into the procedures called by the control programs. Advantageously, a test scenario in which control programs in a batch computing environment can be tested is generated with greatly reduced manual or human intervention.

In one embodiment, a set of external characteristics is incorporated into the control programs. In another embodiment, errors, if any, relating to data set names in the control programs and in the one or more procedures are determined. In yet another embodiment, modifications to the one or more procedures are incorporated by reading the control programs, identifying the procedures invoked by the control programs and symbolics in those procedures, and overriding the symbolics in the procedures. In yet another embodiment, symbolics in the procedures are matched with symbolics specified by a user. In yet another embodiment, the control programs are job control language (JCL) programs and the batch computing environment operates under the Multiple Virtual Storage (MVS) operating system. In yet another embodiment, a variable name is retrieved from the control programs and it is determined whether the variable name is in a user override file. If so, the variable name is replaced with an override name.

In another aspect of the invention, an automated test job control language (JCL) generation tool for creating a JCL test scenario is described. Input to the generation tool includes JCL code corresponding to the JCL members being tested, a list of procedure or PROC libraries and a list of parameter or PARM libraries used by the JCL members, external specifications, reference control files, and overrides. A JCL test scenario is created that includes test JCL libraries, test versions of the reference control files, and test parameter files.

In one embodiment the reference control files are referenced by the JCL members. In another embodiment the referenced control files contain updateable control and history files. In yet another embodiment, the external specifications contain date values, high-level qualifiers, and library concatenations to be used in the JCL members and procedures. In yet another embodiment, the overrides include procedure symbolics or variable names and data set names.

BRIEF DESCRIPTION OF THE DRAWINGS

The invention may be best understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A process for automatically generating a test environment for testing JCL members (JCL "programs" are referred to as JCL members by those skilled in the art of computer batch processing) based on production JCL members is described in the various drawings. Because of the large processing environments involved in testing JCL members, also referred to as jobs, the process of preparing a test scenario for checking changes or additions made to JCL members is an error-prone and time-consuming task. The present invention describes a software tool or component that uses certain input, such as production jobs and procedures, overrides, and specifications, to create components needed to test changes or additions made to the production jobs. It does this with significantly reduced human intervention or "eye-balling" as is currently required in the process, thereby reducing the time needed to create test scenarios and the probability of errors.

Figure 1:
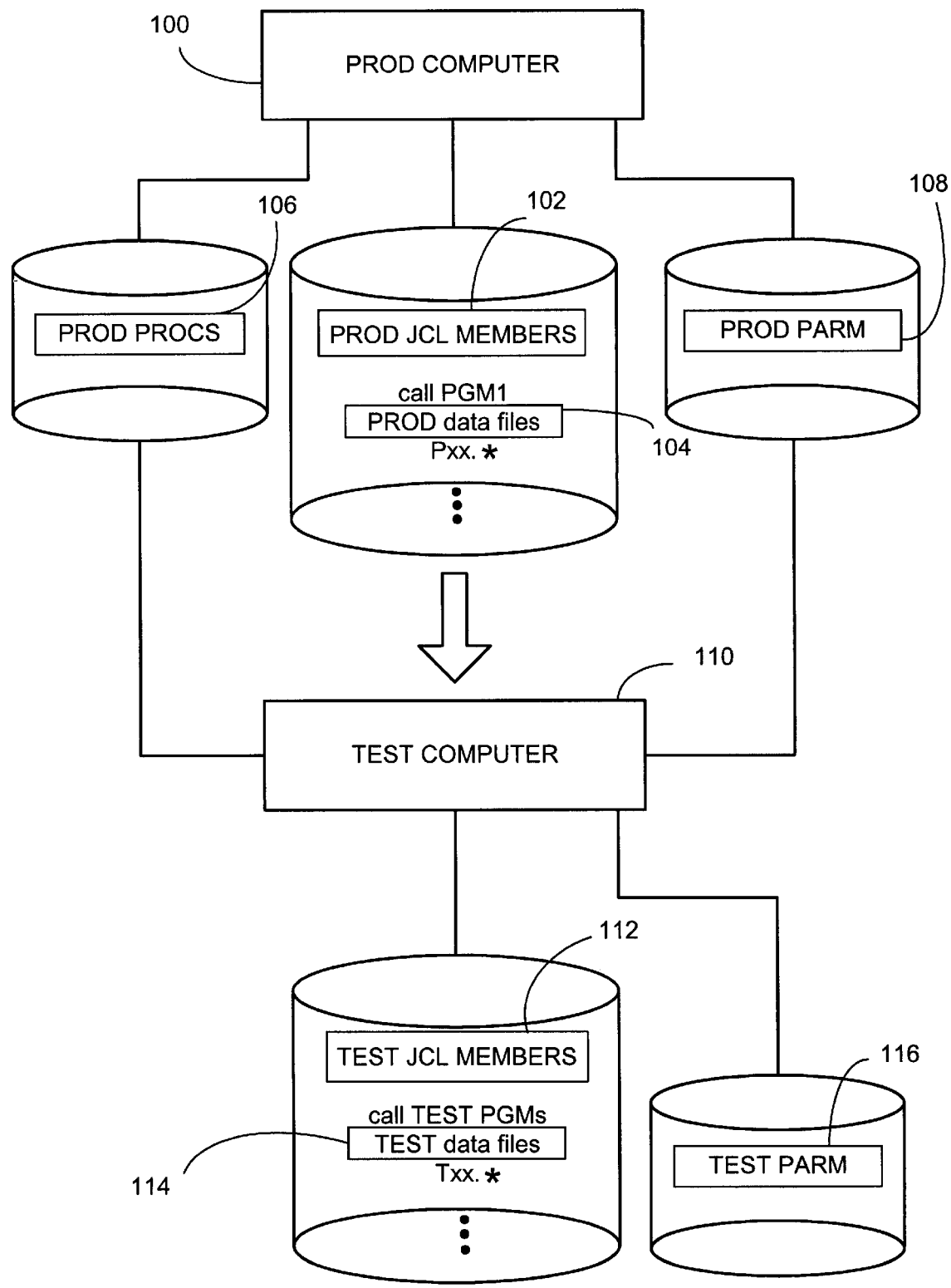
FIG. 1 is a block diagram comparing production and test environment components as is well known in the field of software testing in a batch processing environment.
Figure 2:
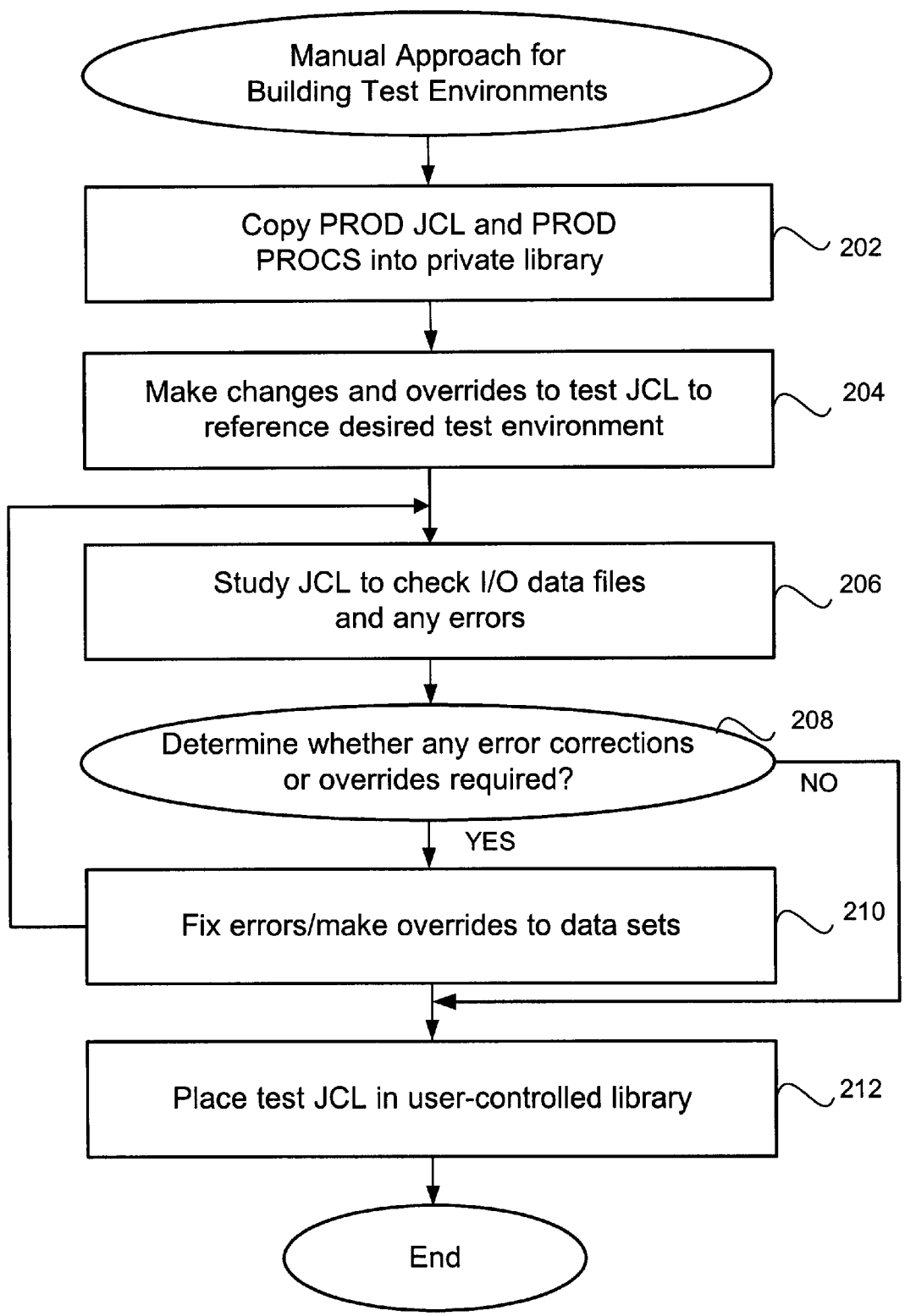
FIG. 2 is a flow diagram showing a process of manually creating a test environment from a production environment as is known in the art.
Figure 3:
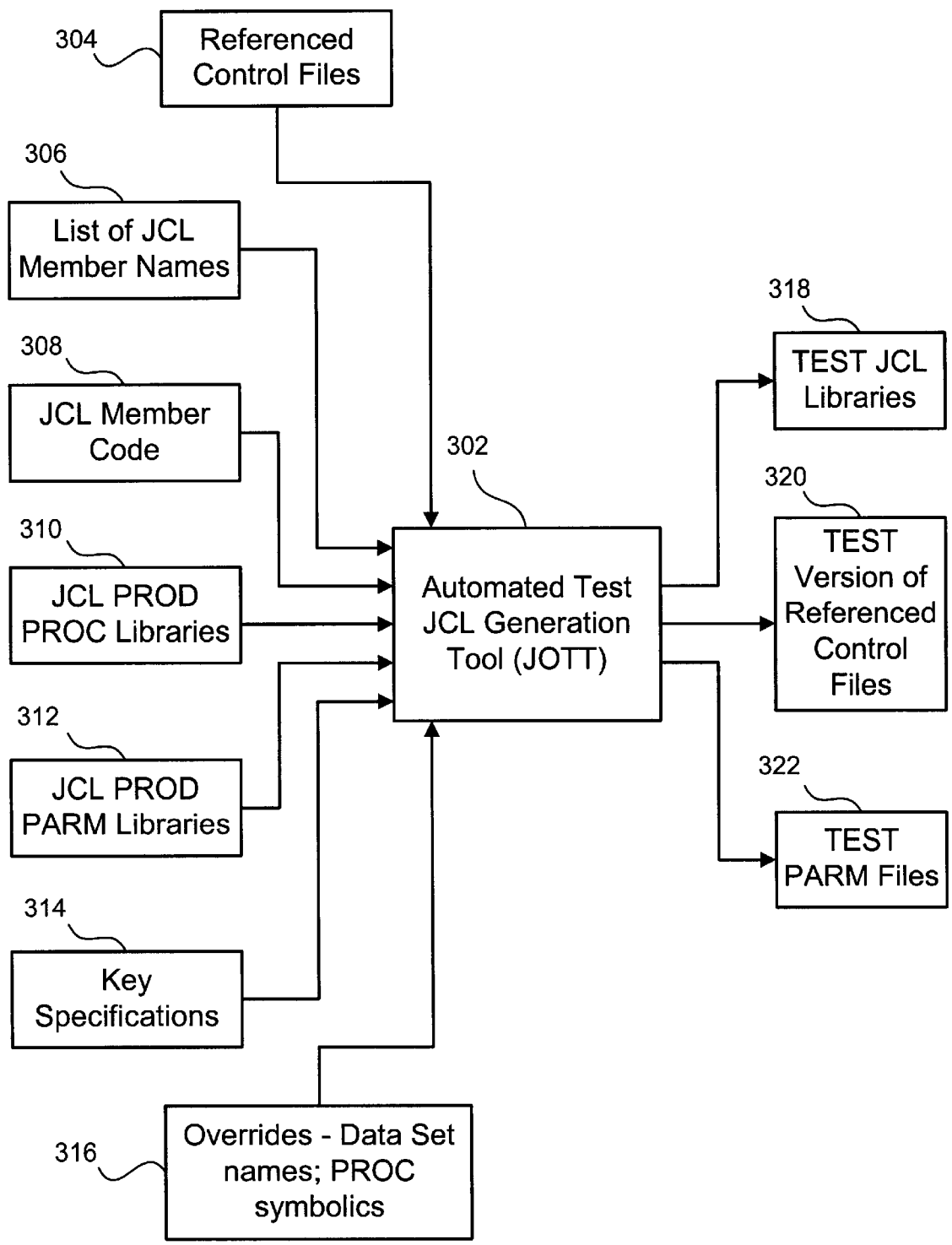
FIG. 3 is a high-level block diagram illustrating the input to and output from an automated test JCL generation tool in accordance with one embodiment of the present invention.

FIG. 3 is a high-level block diagram illustrating the input to and output from an automated test JCL generation tool in accordance with one embodiment of the present invention. An automated test JCL generation tool 302 according to the invention is shown in the center of the diagram. Functionality of generation tool 302 is described in detail below in conjunction with FIGS. 4a and 4b. Going into generation tool 302 are various types of input. In the described embodiment, these inputs include referenced control files 304. Referenced control files 304 are data files referenced by the production JCL members.

A list of JCL member names 306 to be tested is also input to generation tool 302. These JCL members listed comprise one portion of a test scenario that is input to generation tool 302. The creation of this list of JCL member names 306 is described in greater detail in FIG. 5. Block 308 represents the libraries of JCL code and are typically a mixture of production and QA libraries; the JCL names specified in list 306 should all be members of one or more of these libraries. Similarly, libraries of PROCs (or procedures) 310, which again are typically production and QA libraries. The members of these libraries are essentially common procedures (or PROCs or subroutines) that are called by the JCL members 308. Typically, a JCL will execute a PROC passing it parameters (often referred to as PARMs or symbolics) which when substituted into the PROC cause the desired data processing. In a simple example, an HLQ is the high-level qualifier of all the data being processed by the PROC; in production, HLQ may be set equal to "PRD" because all production data begins "PRD" but then in test, the HLQ is set equal to "TST.A1" to ensure our data file names begin "TST.A1". By using PROC symbolics (PARMs) judiciously and setting them in the test JCL, it is possible to avoid having to build test PROC members; this is a considerable saving in time and effort in building a test environment.

Production PARM libraries 312 typically contain many thousands of small files which contain parameters that are used as input to the actual executable code (be it written in COBOL, Assembler, etc.). The nature of the parameters contained within these files is dependent on the program that is using them. For example, IBM provides a utility, IDCAMS, which can be used to build Virtual Storage Access Method (VSAM) files. This utility expects as input some parameters that define the attributes of the file to be built and these would be contained in such a file in a PARM library. Another example might be a general-purpose SORT program which expects to have the nature of the sort (i.e., what fields to sort on) defined in a PARM file. For testing purposes, it is sometimes necessary to create a TEST PARM file. In the IDCAMs example this is very likely given that the IDCAMS PARM file contains a data set name which would need to be converted from a production name to a test name. In the SORT example, it very likely that the production version will work fine and so a test version is not required. In the described embodiment the tool automatically builds test versions of PARM files from their production equivalent and then automatically makes the necessary JCL overrides in order that they be correctly referenced.

Key specifications 314 needed for generating the test JCL members are also input to generation tool 302. For example, key specifications 314 can include a particular date the test is to be performed for date-driven applications and a test high-level qualifier for data set names. Key specification 314 can also include instructions on how to concatenate PROC and LOAD libraries for use in a particular test scenario. A set of user overrides 316 that might be needed to override certain data set names and PROC symbolics (i.e., variable names) in the test JCL are input to test generation tool 302. The role of these overrides is described in FIGS. 4 and 5 below.

Reference control files 304 are file structures that are typically updated by the application in question in order to control the sequencing of data. For example, many applications keep history files formatted in such a way that when a particular process on a particular day is complete, the file is updated accordingly. Typically these files control the order in which data is processed and prevent erroneous data duplication or data omission. In the testing world it is critical that these files be initialized in a such a way that: header and/or trailer records are formatted correctly; any date-related information is set up according to the run date of the test; and historical data is either cleaned out or populated in depending on what is required. For these reasons reference control files 304 are made available to the tool in order to automatically generate test versions of these control files.

Shown on the right side of FIG. 3 are various output from generation tool 302 in the described embodiment. A library of TEST JCL members 318 is one output generated by generation tool 302. In the described embodiment, the members of library 318 contain pointers to a TEST version of referenced control files 320 and a set of test PARM files 322. TEST version of reference control files 320 contains test versions of data files referenced by the JCL; some of these may originate from reference control files 304. That is, they contain configuration control files that are generally static files and dynamically updated history files that are initially empty and are populated while the TEST JCL members are executed. TEST JCL members in JCL libraries 318 use TEST reference control files 320 when executed. Similarly, TEST PARM files 322 contain TEST PARM files that need to be used in preference to the same named PROD PARM files.

Figure 4A:
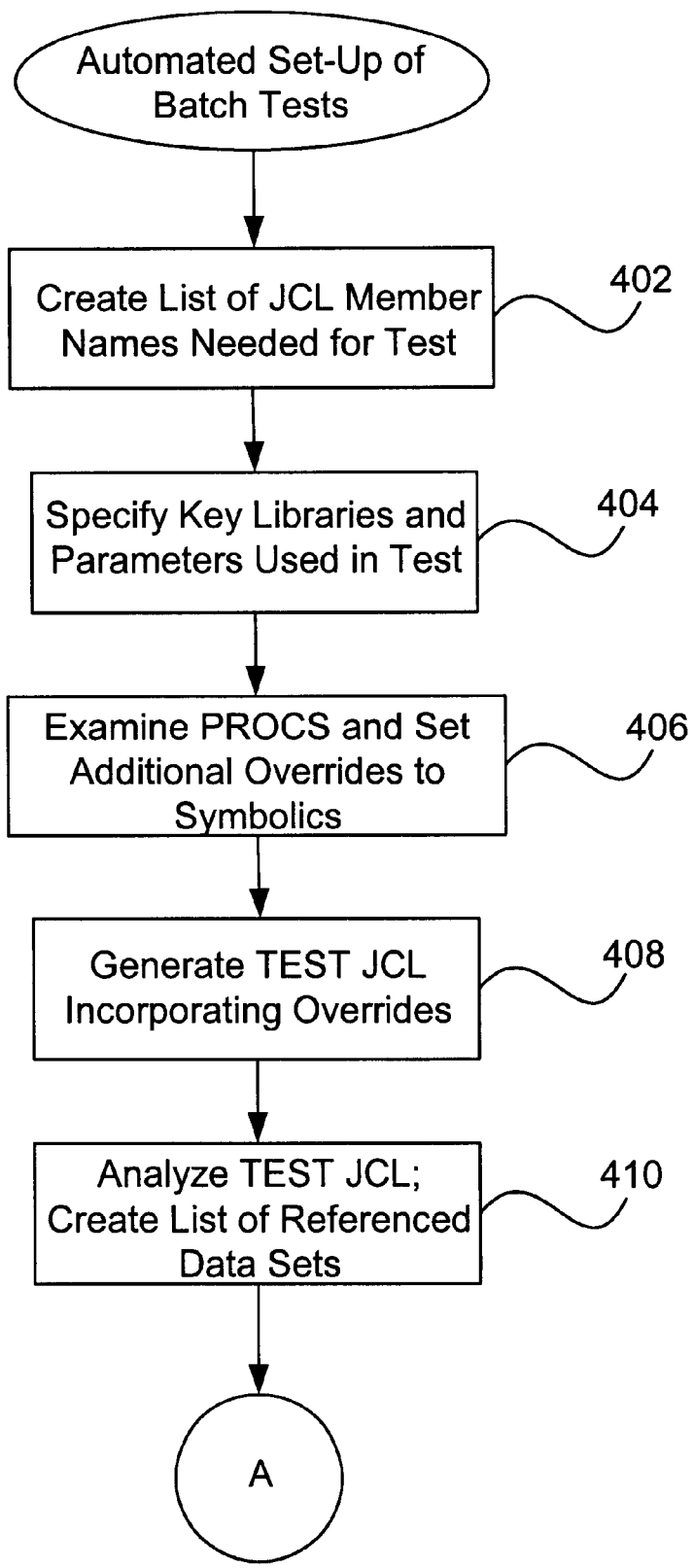
FIGS. 4a and 4b are flow diagrams of a process for an automated set-up of batch JCL test programs in accordance with one embodiment of the present invention.
Figure 4B:
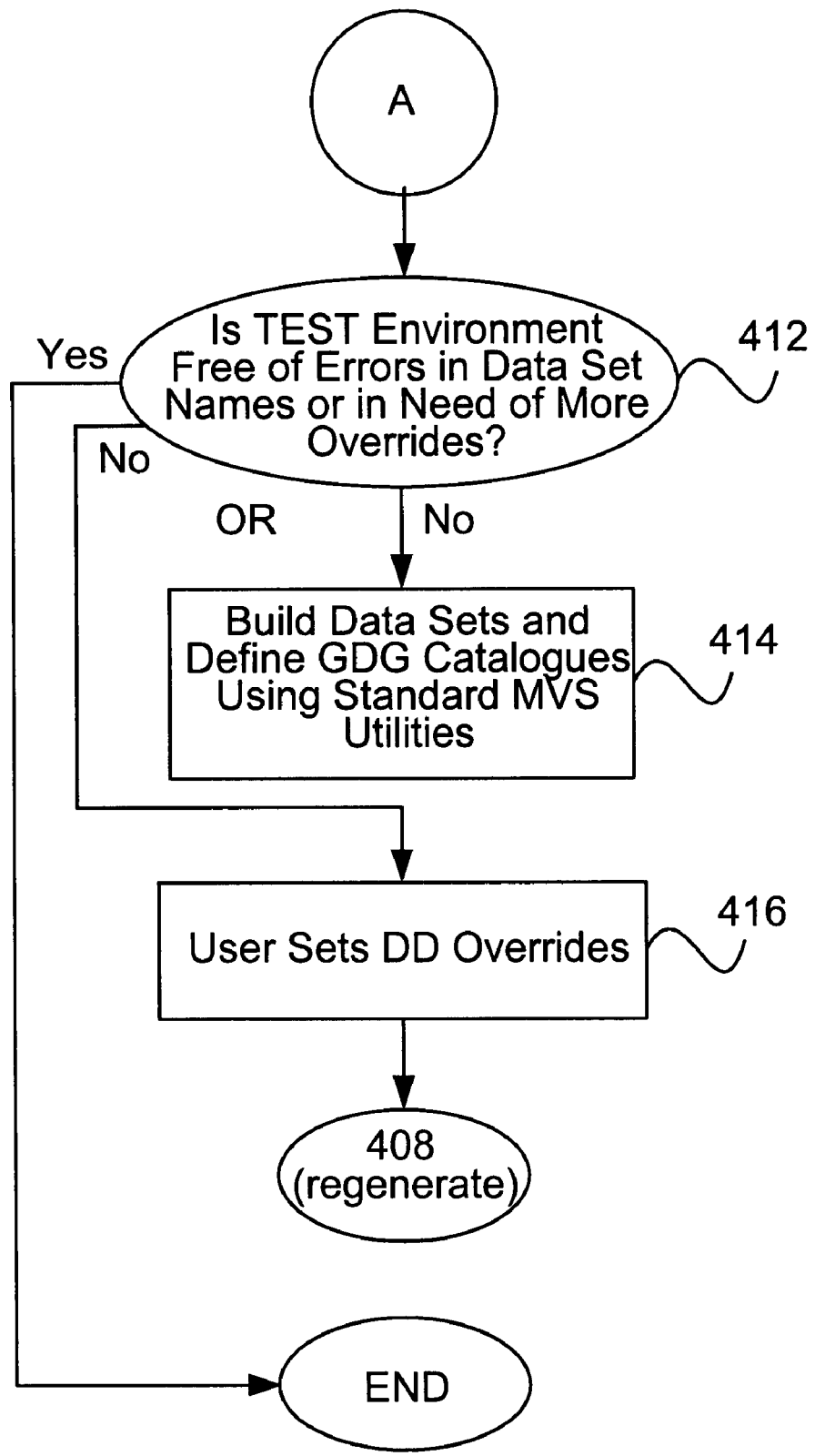

FIGS. 4a and 4b are flow diagrams of a process for an automated set-up of batch JCL test programs in accordance with one embodiment of the present invention. With respect to FIG. 3, the flow diagrams discussed here describe a process taking place in automated test generation tool 302. At step 402 a list of JCL member names 306 to be tested is created. This list of job names makes up what is referred to as a test scenario. The number of jobs in such list 306 can vary widely. As an example, a typical test scenario may contain anywhere from 30 to 300 jobs. Step 402 is described in greater detail in FIG. 5.

After creating list of JCL member names 306 of JCL members to be tested, key libraries and parameters that are needed in the test are specified by a tester, such as an employee responsible for testing the batch JCL. This is done at step 404. These libraries and key specifications essentially describe how the test environment will look. They include names of JCL PROC libraries and LOAD libraries, and concatenations of these libraries. LOAD libraries hold load modules (e.g, compiled application programs) needed to execute the batch programs being tested. Both these types of libraries are well known in the art. An example of a key specification that may be needed in a test set-up is a date parameter specifying when a test will be run if the test being run is date driven and a test high-level qualifier (HLQ) that is used to replace production names and help distinguish a particular tester's test scenario from other test scenarios. An example of an HLQ is Txx.TEST1. Thus, whenever a production qualifier, such as Pxx is referenced, it is replaced with Txx.TEST1.

At step 404, the tester or programmer can also specify a "hot list" that includes static files that define the nature of the batch environment, such as currency files, configuration files, and institutional-specific files (e.g. specific requirements for certain banks or companies). In the described embodiment, the hot list contains data set equivalents for data sets the tester knows have to be overridden. It tells test generation tool 302 that if it locates a particular data set name ("DSN"), replace it with another specified DSN.

At step 406 the tester examines the JCL PROCs to determine which, if any, need to be passed test parameters by the JCL members being tested. Automated test generation tool 302 provides assistance to the tester by extracting only pertinent information thereby helping the tester assess what changes need to be made. The tester can then set additional overrides to symbolics or variable names in the JCL members if needed, which in most cases are not since the HLQs and date serve to set many of these parameters automatically. These additional overrides are referred to as user overrides. Step 406 is described in greater detail in FIG. 6.

At step 408 the tester generates the test JCL having incorporated or plugged in all the user overrides, hot list overrides, and key specifications into the JCL at the correct points. Step 408 is described in more detail in conjunction with FIG. 7. At step 410, the test JCL created in step 408 is examined. In the described embodiment, the programmer also creates a list of data sets referenced by the JCL members and also ensures that the programs are in condition to be executed. The list of data sets typically contains the names of all the files referenced in the JCL, ordered by what PROC, STEP and DD they are defined in, and with an assessment of the data set's disposition and other information. The technique that is used in the described embodiment to develop this information is to call (programmatically) a proprietary product, such as JOBSCAN, available from Diversified Systems Software, widely used in the field, and decipher the output of that product, formatting it in a way that is more usable.

At step 412 the tester goes through the list of referenced data sets created in step 410 and checks whether the test environment or scenario created is free of errors. One type of error that can occur is with respect to data set cataloging. By checking the cataloging of the DSNs, the tester generally ensures that any data set names assigned to new data sets being created do not already exist in the system and that any data sets referenced by the JCL members and PROCs actually exist in the system. In this respect, the user can correct errors in one of two ways. One way is shown at step 414 where the tester corrects the error by building the data set in question correctly using standard MVS utilities. Another way is shown at step 416 where the tester sets an override to the data set name that does exist or is valid.

At this stage the tester returns to step 408 and once again generates another test scenario that includes the TEST JCL members and corrections and overrides made in steps 414 and 416. Returning to step 412, if the tester determines that there are no errors in data set names or need for additional overrides, the process of automatically generating a JCL test environment is complete.

Figure 5:
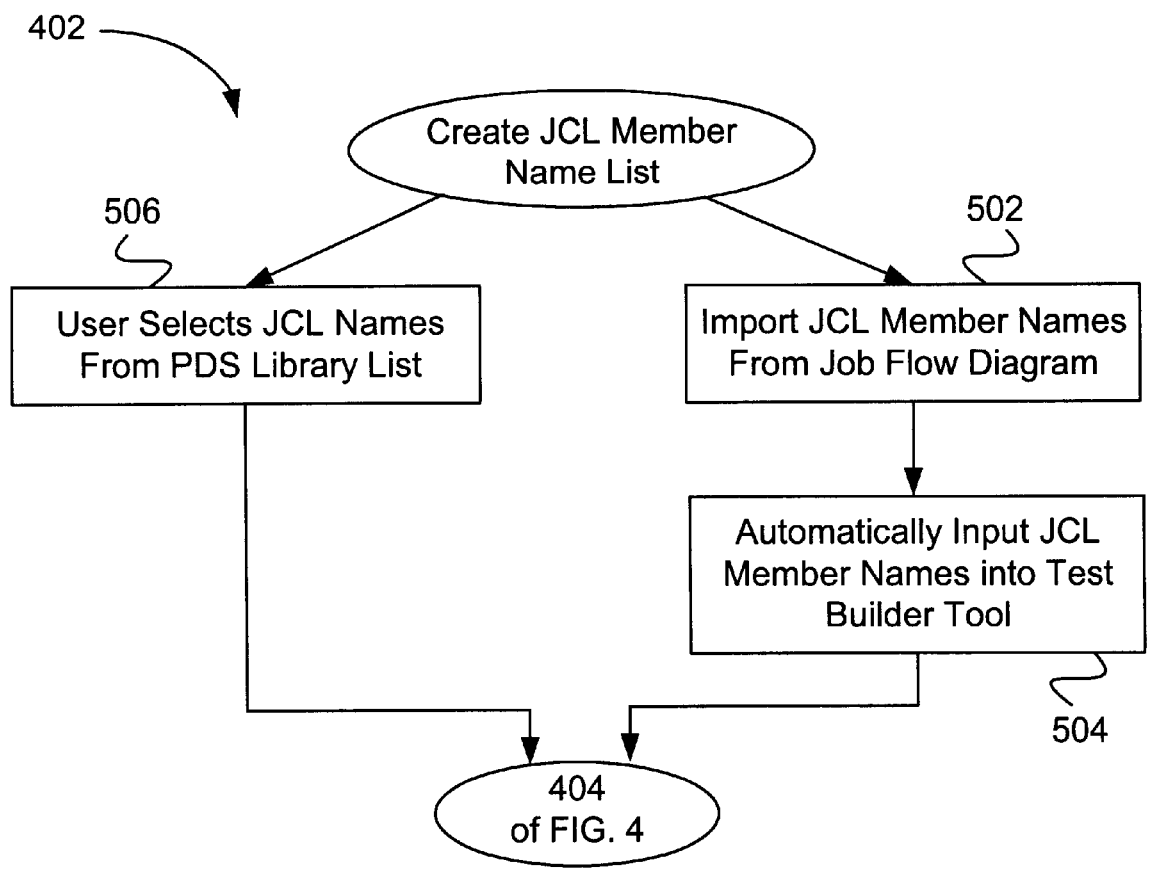
FIG. 5 is a flow diagram showing in greater detail step 402 of FIG. 4 in accordance with one embodiment of the present invention.

FIG. 5 is a flow diagram showing in greater detail step 402 of FIG. 4 in accordance with one embodiment of the present invention. It describes steps for creating a JCL member name list. In the described embodiment, there are at least two methods of creating a JCL member name list as shown in the flow diagram of FIG. 5. One technique involves interrogating a production job scheduler, a utility widely used in the field, such as Control-M of New Dimensions. At step 502 the JCL member names are imported from a job flow diagram. A job flow diagram is generated automatically or semi-automatically from a job scheduler.

At step 504 JCL member name list 306 is automatically input into the test JCL generation tool 302 of the present invention. At this stage the process continues with step 404 of FIG. 4. The other technique for creating the JCL member name list requires more intervention from the tester. As described in step 506, the user, through a regular ISPF user-interface panel, manually selects the JCLs the tester wishes to test from a list of all the members of the JCL library. Typically, the user interface presents the user with a list of possibly hundreds of JCL member names and the tester chooses which ones are to be tested and inputs them into JCL test generation tool 302. The result of this process using either technique shown or other techniques is a test scenario file of JCL member names. The process then continues with step 404 of FIG. 4.

Figure 6:
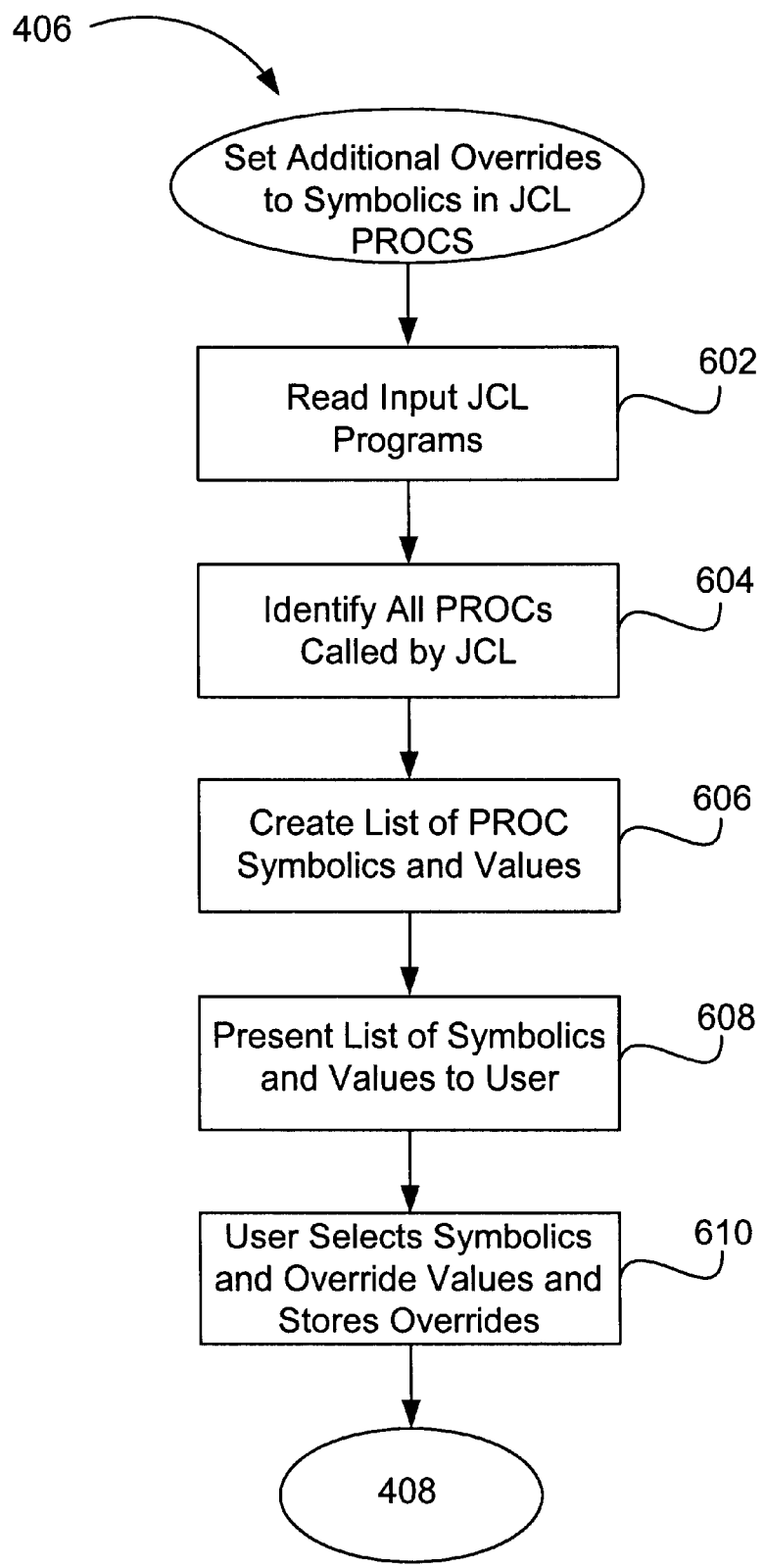
FIG. 6 is a flow diagram showing in greater detail step 406 of FIG. 4 in accordance with one embodiment of the present invention.

FIG. 6 is a flow diagram showing in greater detail step 406 of FIG. 4 in accordance with one embodiment of the present invention. FIG. 6 describes in greater detail a process of setting additional overrides to symbolics in the JCL PROCs called by the JCL members selected for testing. JCL PROCs can be described as subroutines called by JCL members and is a way of keeping frequently executed modules in a common location. In the described embodiment, a component of automated test generation tool 302, referred to as JT-Analyze analyzes a section of JCL and from it builds a test copy containing changes as defined by all the user's input. At a step 602 the JCL members selected in step 402 are read by test generation tool 302. At step 604 the test generation tool identifies all the PROCs called or invoked by the selected JCL members. At step 606 test generation tool 302 reads all the PROCs referenced by the selected JCL members and creates a list of symbolics or variable names in the PROCs and their values.

At step 608 the list of symbolics and their corresponding values are presented to the tester. In one embodiment, the tester manually intervenes by examining the list and decides which symbolic/value pair to change or override, if any. This is done based on the type of test being performed. This step may be automated as well. At step 610 the tester selects the symbolics that must be overridden and provides the override values. This list of override values is stored by appending the list to the test scenario file which is later used by test generation tool 302. The test scenario file (with the list of appended override values) is input to test generation tool 302 at step 408 of FIG. 4.

Figure 7A:
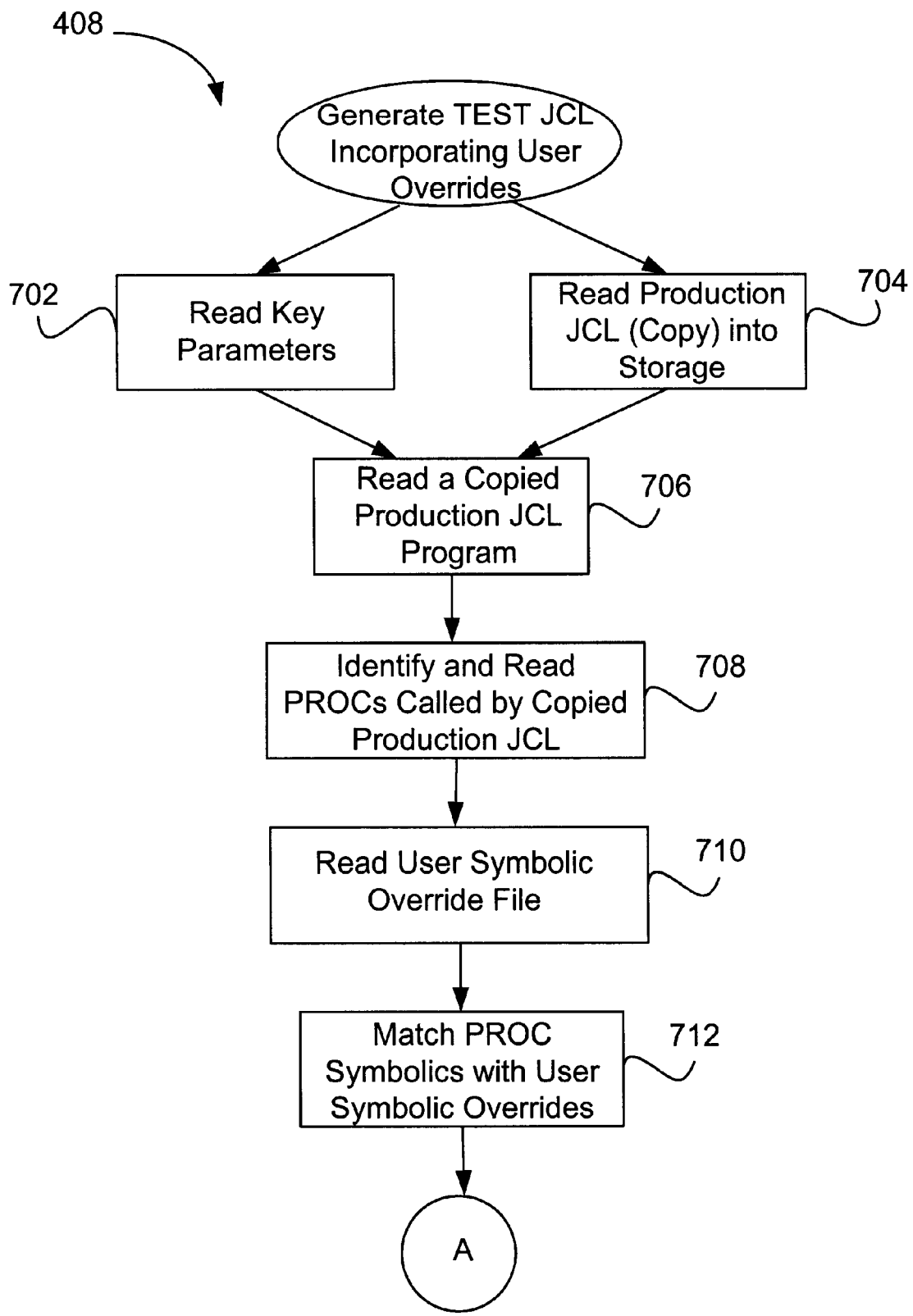
FIGS. 7a and 7b are flow diagrams showing step 408 of FIG. 4 in greater detail in accordance with one embodiment of the present invention.
Figure 7B:
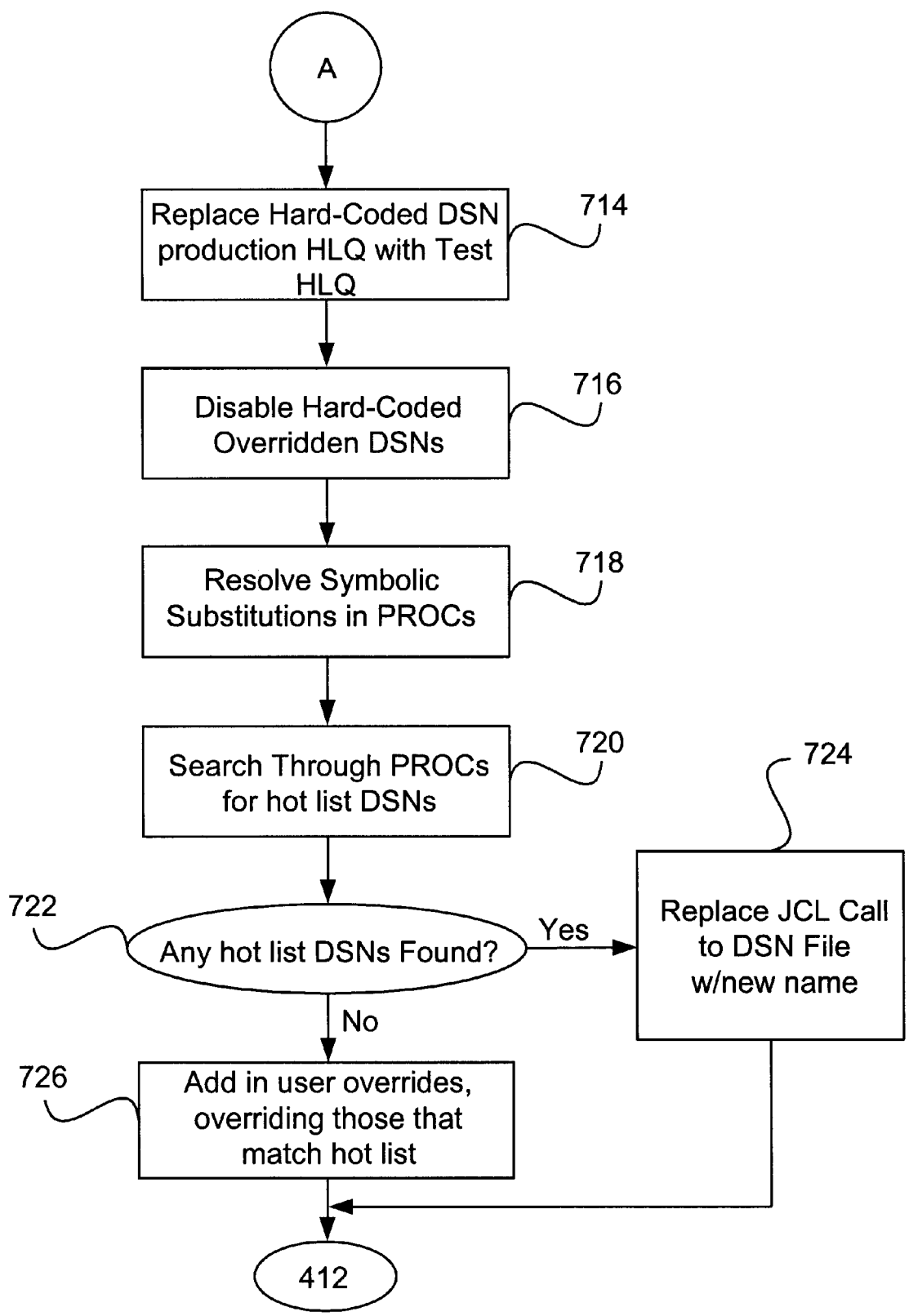

FIGS. 7a and 7b are flow diagrams showing step 408 of FIG. 4 in greater detail in accordance with one embodiment of the present invention. These figures describe in greater detail a process for generating test JCL members incorporating overrides specified by the tester. At the outset two functions are performed in tandem. At step 702 automatic test generation tool 302 reads key specifications 314. In the described embodiment these include specifications such as JCL PROC and LOAD library concatenations which instruct test generation tool 302 where to look for PROCs and LOAD modules invoked by the selected JCL members (JCL member names 306 and JCL member code 308) being tested. Other specifications include specific dates for applications that are date driven and test HLQs to replace production high level qualifiers. At step 704 test generation tool 302 copies and stores the selected production JCL members. The actual production JCL members are not altered in any way. In the described embodiment, the test scenario generated by test generation tool 302 of the present invention is based on production JCL members. In other embodiments, the test scenario can be based on JCL members other than actual production JCL. The techniques and processes of the present invention can apply to JCL members and PROCs from any type of environment, including a production or other test environment.

At step 706 test generation tool 302 reads a JCL member copied and stored at step 704. In the following description, a process for one JCL member is discussed. The process, however, can be applied to multiple JCL members concurrently and is not necessarily applied to one JCL member at a time. At step 708 test generation tool 302 only identifies and reads the PROCs in production PROC libraries 310 called by the production JCL member copied and stored at step 704. This step is similar to step 604 of FIG. 6 except at step 708 test generation tool 302 identifies and reads the PROCs.

At step 710 test generation tool 302 reads tester-specified symbolic override file 316 created at step 610 of FIG. 6 which stores the overrides for PROCs invoked by the selected JCL members being tested. At step 712 test generation tool 302 matches the PROC symbolics derived by the tester via steps 406 and 606 with user symbolic overrides. At this step symbolics in the PROCs are matched with symbolics being overridden. This is the first step in preparing to replace the PROC symbolics in PROCs invoked by the selected JCL members with the new tester-specified symbolic overrides. At this stage, in the described embodiment, PROC symbolics come from four places: the JCL member code 308, the PROC from JCL production PROC libraries 310, user overrides, and key specifications 314 (a type of "automatic override"). Step 712 is described in greater detail in FIG. 8. As described below, the actual substitution of the PROC symbolics with the overrides occurs at step 718.

At step 714 test generation tool 302 replaces the hardcoded DSN high-level qualifiers in the stored JCL member and PROCs with a test HLQ. For example, if a DSN begins with a production HLQ such as "Pxx," it is replaced with a test HLQ such as "Txx. TEST1." Thus, a reference to a production file named Pxx.ADDRESS FILE is converted to Txx.TEST1.ADDRESS FILE. The "Txx" indicates that the JCL member or PROC should not reference the production file and the TEST1 prefix indicates a particular test being run since several testers may use the same ADDRESS FILE; that is, the TEST1 indicates that the test file belongs to a particular test scenario. At step 716 the hard-coded DSNs that the tester wanted to be overridden are disabled. These are typically DSNs in the "hot list", as described above, that must be overridden. They also include user-specific (i.e., location) overrides.

At step 718 the values for PROC symbolics, part of overrides 316, are substituted with the tester-specified override values as determined by the match performed earlier at step 712. After step 718 all PROC symbolics 316 that should be overridden are converted to variable names that reflect the test scenario. For example, the symbolic SYSTEM can have the value PROD indicating a production system. This symbolic value can be overridden to have the value "TEST", so that SYSTEM=TEST. The PROCs are typically not changed; they are only passed symbolic values to reflect the test environment. At step 720 test generation program 302 searches through the PROCs for the hot list DSNs.

At step 720 test generation program 302 searches for hot list DSNs in the PROCs. If the program 302 determines that there are hot list DSNs in the PROCs called by the source JCL at step 722, a data definition ("DD") override is placed in the test JCL as needed as shown in step 724. In the described embodiment, the hot list overrides are performed or inserted after the user or DD overrides. If there are no hot list DSNs found at step 722, test generation program 302 inserts the user overrides that match those in the hot list only at step 726. User overrides are location-specific; that is, test generation tool 302 knows exactly where to make the substitution. This is not true for the hot list substitution. With hot list substitutions, whenever a particular file reference is encountered, a substitution is made. The process then continues with step 410 of FIG. 4.

Figure 8:
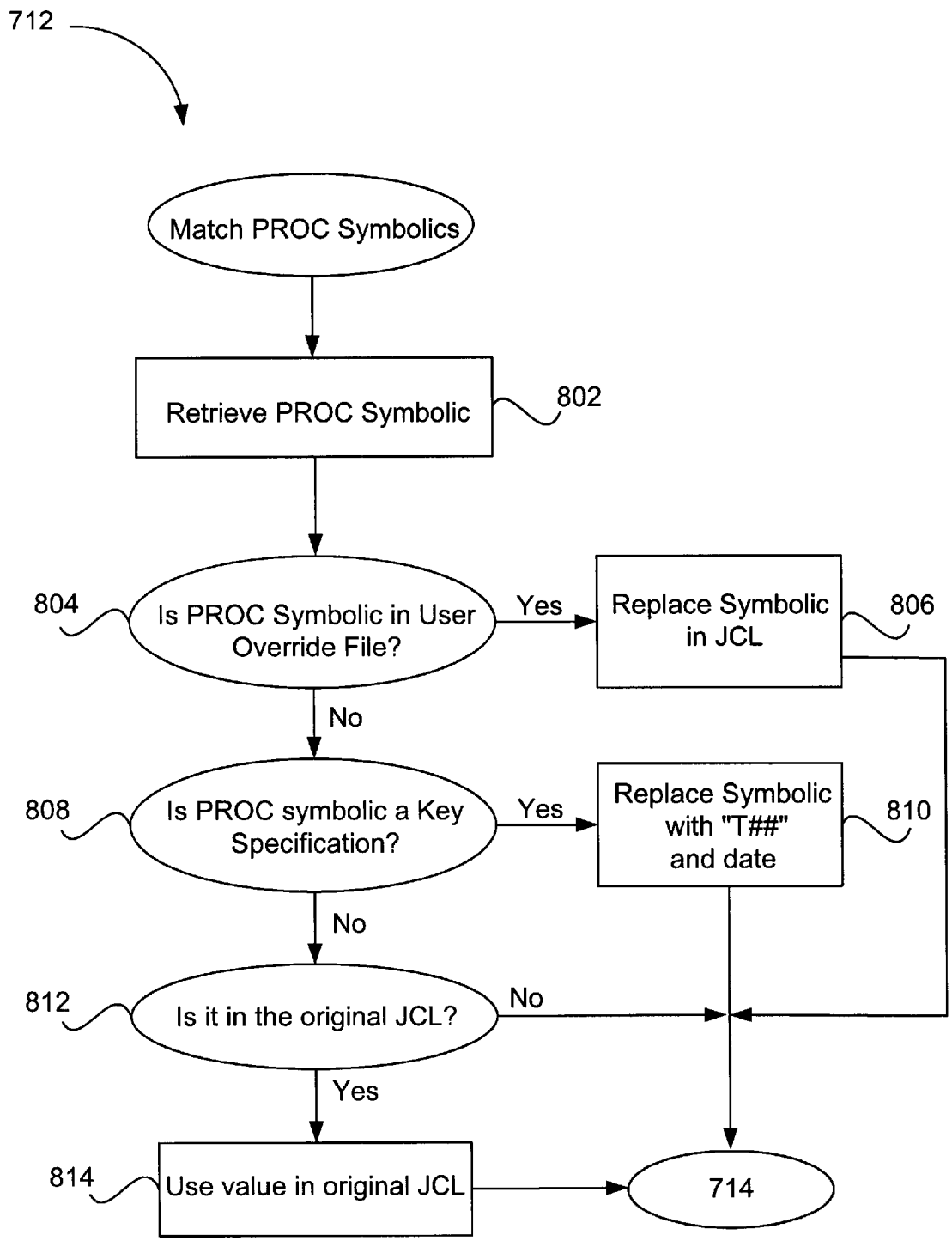
FIG. 8 is a flow diagram showing in greater detail step 712 of FIG. 7 in accordance with one embodiment of the present invention.

FIG. 8 is a flow diagram showing in greater detail step 712 of FIG. 7 in accordance with one embodiment of the present invention. It describes a process of matching a PROC symbolic (i.e., a variable name) with a tester-specified override such as the value TEST for the symbolic SYSTEM. At step 802 test generation program 302 retrieves a PROC symbolic from the PROC symbolic list developed at steps 606 to 610. At step 804 test generation tool 302 determines whether the PROC symbolic is in the user override file created at step 610. If it is, the PROC symbolic is replaced with the user override symbolic at step 806 after which the process of matching one of the PROC symbolics with a user override is complete. If the PROC symbolic is not in the user override file, the test generation tool determines whether the PROC symbolic is a key specification at step 808 as described in steps 404 of FIG. 4 and 702 of FIG. 7. If it is, the prefix of the PROC symbolic is replaced with a test prefix such as "Txx.TEST1" and dates (for date sensitive tests) are modified at step 810. If the PROC symbolic is not a key specification, test generation tool 302 checks whether it is in the original JCL members at step 812. If the PROC symbolic is in the original JCL source, the value for the symbolic in the original JCL source is used as shown in step 814. At this stage the process for matching PROC symbolics is complete. If the PROC symbolic is not in the original JCL source program, the symbolic is ignored and the process is complete.

Figure 9:
FIG. 9 is a flow diagram of a process for creating a list of referenced data sets in accordance with one embodiment of the present invention.

FIG. 9 is a flow diagram of a process for creating a list of referenced data sets in accordance with one embodiment of the present invention. It shows in greater detail step 410 of FIG. 4 where the TEST JCL is analyzed and a list of data set names referenced by the TEST JCL is created. At step 902 a report containing certain characteristics of data sets referenced by the TEST JCL is created. In the described embodiment this is done by inputting the TEST JCL (created in step 408 of FIG. 4) into a commonly used proprietary software tool, such as JOBSCAN, to generate the report. The report created typically contains characteristics such as location of the data sets, whether the data set is a PDS file or a sequential file, and the disposition of the data set, among others.

Reports created by proprietary programs are usually cryptic or in a format that is difficult to read. At step 904 test generation tool 302 accepts as input one or more of these characteristics reports. It reformats the reports based on data set name thereby making it easier to analyze while preserving the characteristics information for each data set. It then stores the reformatted files. In a non-automated test environment, a tester would have to read or "eyeball" the characteristics report to determine the characteristics of each data set. At step 906 test generation tool 302 checks the status of each data set by examining its characteristics and creates a list of referenced data sets. The process continues with step 412 of FIG. 4b where test generation tool 302 examines whether the data set names are free of errors or in need of overrides.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, overriding, extracting, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered, however, that all of these and similar terms are to be associated with the appropriate physical quantities and are merely convenient labels applied to these quantities.

The present invention also relates to software tools or systems for performing the aforementioned operations. A system can be specially constructed for the required purposes, or it can be a general-purpose computer selectively activated or configured by a computer program stored in the computer. The processes presented above are not inherently related to any particular computer or other computing apparatus. In particular, various general-purpose computers can be used with programs written in accordance with the teachings herein, or, alternatively, it may be more convenient to construct a more specialized computer system to perform the required operations, such as creating the TEST JCL libraries and TEST versions of the referenced control files.

Figure 10:
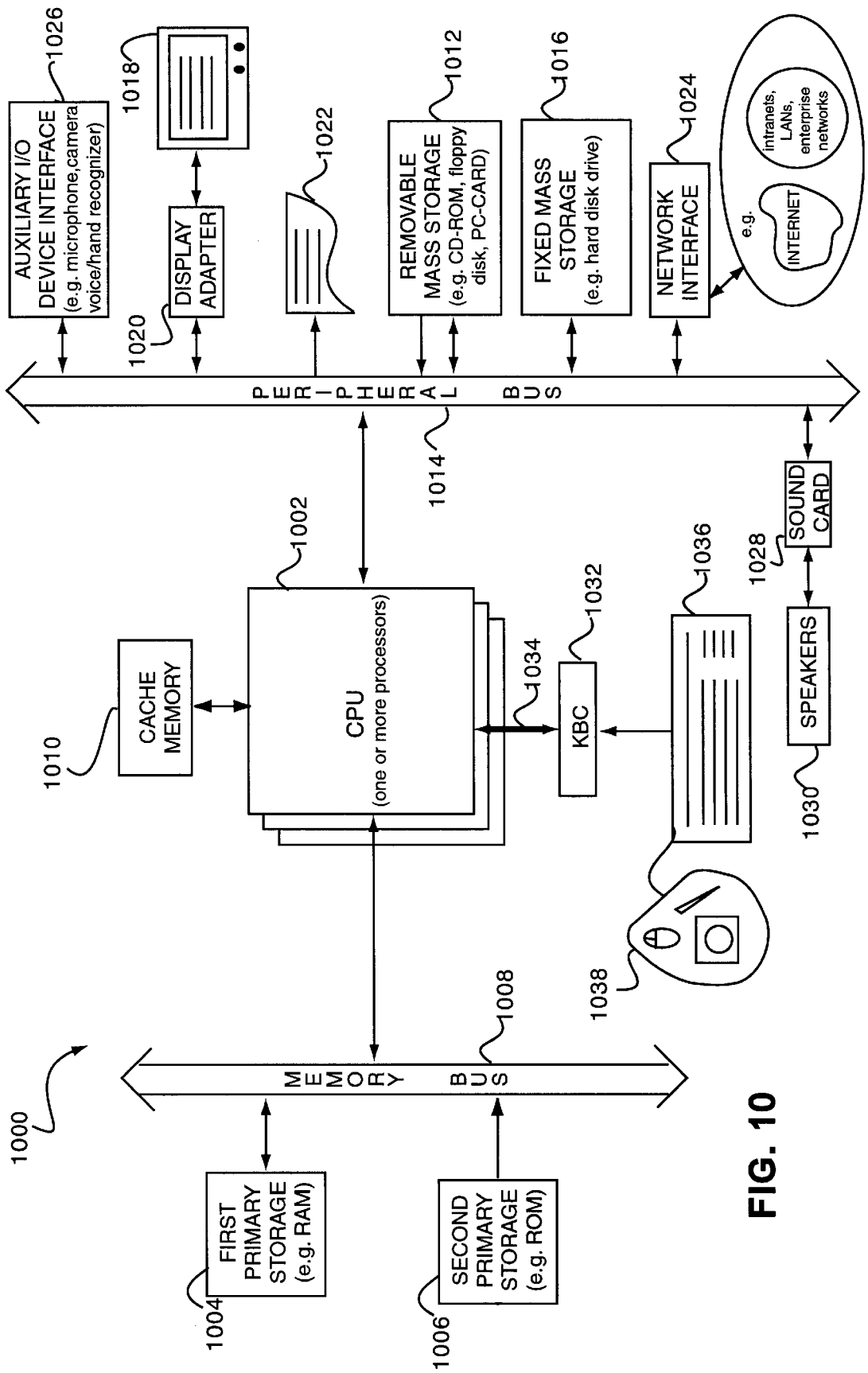
FIG. 10 is a block diagram of a general purpose computer system 1000 suitable for carrying out the processing in accordance with one embodiment of the present invention.

FIG. 10 is a block diagram of a general purpose computer system 1000 suitable for carrying out the processing in accordance with one embodiment of the present invention. FIG. 10 illustrates one embodiment of a general purpose computer system. Other computer system architectures and configurations can be used for carrying out the processing of the present invention. Computer system 1000, made up of various subsystems described below, includes at least one microprocessor subsystem (also referred to as a central processing unit, or CPU) 1002. That is, CPU 1002 can be implemented by a single-chip processor or by multiple processors. It should be noted that in re-configurable type computing systems, CPU 1002 can be distributed amongst a group of programmable logic devices. In such a system, the programmable logic devices can be reconfigured as needed to control the operation of the computer system 1000. In this way, the manipulation of input data is distributed amongst the group of programmable logic devices. CPU 1002 is a general purpose digital processor which controls the operation of the computer system 1000. Using instructions retrieved from memory, the CPU 1002 controls the reception and manipulation of input data, and the output and display of data on output devices.

CPU 1002 is coupled bi-directionally with a first primary storage 1004, typically a random access memory (RAM), and uni-directionally with a second primary storage area 1006, typically a read-only memory (ROM), via a memory bus 1008. As is well known in the art, primary storage 1004 can be used as a general storage area and as scratch-pad memory, and can also be used to store input data and processed data. It can also store programming instructions and data, in the form of segments or portions of bits taken from longer, sequences of bits, such as transient data streams or random data streams. This is in addition to other data and instructions for processes operating on CPU 1002, and is used typically for fast transfer of data and instructions in a bi-directional manner over the memory bus 1008. Also, as well known in the art, primary storage 1006 typically includes basic operating instructions, overrides, program code, data and objects used by the CPU 1002 to perform its functions. Primary storage devices 1004 and 1006 may include any suitable computer-readable storage media, described below, depending on whether, for example, data access needs to be bi-directional or uni-directional. CPU 1002 can also directly and very rapidly retrieve and store frequently needed data in a cache memory 1010.

A removable mass storage device 1012 provides additional data storage capacity for the computer system 1000, and is coupled either bi-directionally or uni-directionally to CPU 1002 via a peripheral bus 1014. For example, a specific removable mass storage device commonly known as a CD-ROM typically passes data uni-directionally to the CPU 1002, whereas a floppy disk can pass data bi-directionally to the CPU 1002. Storage 1012 may also include computer-readable media such as magnetic tape, flash memory, signals embodied on a carrier wave, Smart Cards, portable mass storage devices, holographic storage devices, and other storage devices. A fixed mass storage 1016 also provides additional data storage capacity and is coupled bi-directionally to CPU 1002 via peripheral bus 1014. The most common example of mass storage 1016 is a hard disk drive. Generally, access to these media is slower than access to primary storages 1004 and 1006. Mass storage 1012 and 1016 generally store additional programming instructions, data, and the like that typically are not in active use by the CPU 1002. It will be appreciated that the information retained within mass storage 1012 and 1016 may be incorporated, if needed, in standard fashion as part of primary storage 1004 (e.g. RAM) as virtual memory.

In addition to providing CPU 1002 access to storage subsystems, the peripheral bus 1014 is used to provide access other subsystems and devices as well. In the described embodiment, these include a display monitor 1018 and adapter 1020, a printer device 1022, a network interface 1024, an auxiliary input/output device interface 1026, a sound card 1028 and speakers 1030, and other subsystems as needed.

The network interface 1024 allows CPU 1002 to be coupled to another computer, computer network, or telecommunications network using a network connection as shown. Through the network interface 1024, it is contemplated that the CPU 1002 might receive information, e.g., JCL members, PROCs, or PARMs from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 1002 can be used to connect the computer system 1000 to an external network and transfer data according to standard protocols. That is, method embodiments of the present invention may execute solely upon CPU 1002, or may be performed across a network such as the Internet, intranet networks, or local area networks, in conjunction with a remote CPU that shares a portion of the processing. Additional mass storage devices (not shown) may also be connected to CPU 1002 through network interface 1024.

Auxiliary I/O device interface 1026 represents general and customized interfaces that allow the CPU 1002 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 1002 is a keyboard controller 1032 via a local bus 1034 for receiving input from a keyboard 1036 or a pointer device 1038, and sending decoded symbols from the keyboard 1036 or pointer device 1038 to CPU 1002. The pointer device can be a mouse, stylus, track ball, or tablet, and is useful for interacting with a graphical user interface.

In addition, embodiments of the present invention further relate to computer storage products including a computer readable medium that contains program code for performing various computer-implemented operations. The computer-readable medium is any data storage device that can store data that can thereafter be read by a computer system. The media and program code can be those specially designed and constructed for the purposes of the present invention, or they may be of the kind well known to those of ordinary skill in the computer software arts. Examples of computer-readable media include, but are not limited to, all the media mentioned above, magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code, such as JCL code, include both machine code, as produced, for example, by a compiler, or files containing higher level code that may be executed using an interpreter.

It will be appreciated by those skilled in the art that the above described hardware and software elements are of standard design and construction. Other computer systems suitable for use with the present invention can include additional or fewer subsystems. In addition, memory bus 1008, peripheral bus 1014, and local bus 1034 are illustrative of any interconnection scheme serving to link the subsystems. For example, a local bus could be used to connect the CPU to fixed mass storage 1016 and display adapter 1020. The computer system shown in FIG. 10 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, test copies or versions of the PROCs called by the test JCL members can be created and used instead of using production PROCs. In another example, user-specified and other overrides can be contained in different types of files and can be given different hierarchies or orders of precedence. Accordingly, the present embodiments are to be considered as illustrative and not restrictive, and the invention is not to be limited to the details given herein, but may be modified within the scope and equivalents of the appended claims.

What is claimed is:

1. A method of automatically generating a test environment for testing control programs in a batch computing environment, the method comprising:

creating a control program list containing names of control programs to be tested;

specifying custom characteristics of the test environment;

determining whether one or more procedures called by the control programs need to be modified;

incorporating the custom characteristics into the control programs; and incorporating modifications to the one or more procedures, thereby generating a test scenario in which the control programs in a batch computing environment can be tested.

2. A method as recited in claim 1 further comprising:

incorporating a set of external characteristics into the control programs.

3. A method as recited in claim 2 wherein the set of external characteristics include currency data and institutional-specific data.

4. A method as recited in claim 1 further comprising:

determining errors relating to data set names in the control programs and in the one or more procedures.

5. A method as recited in claim 1 wherein creating a control program list further includes:

importing program names from a control program flow diagram.

6. A method as recited in claim 1 wherein incorporating modifications to the one or more procedures further comprises:

reading the control programs;

identifying the one or more procedures invoked by the control programs;

identifying symbolics in the one or more procedures; and overriding symbolics in the one or more procedures.

7. A method as recited in claim 6 further comprising:

matching symbolics in the one or more procedures with symbolics specified by a user.

8. A method as recited in claim 1 wherein incorporating the custom characteristics into the control programs further includes reading library concatenations.

9. A method as recited in claim 1 further comprising:
overriding one or more variable names in the control programs.

10. A method as recited in claim 1 wherein the control programs are job control language programs (JCL).

11. A method as recited in claim 1 wherein the batch computing environment operates under the MVS operating system.

12. A method as recited in claim 1 wherein the one or more procedures are job control language procedures (PROCs).

13. A method as recited in claim 1 further comprising:
retrieving a variable name from the control programs;
determining whether the variable name is in a user override file; and
replacing the variable name with an override name.

14. An automated test job control language (JCL) generation tool for creating a JCL test scenario, the generation tool comprising:
JCL code corresponding to a plurality of JCL programs;
a list of procedure libraries used by the plurality of JCL programs;
a list of parameter libraries used by the plurality of JCL programs;
a plurality of external specifications;
a plurality of referenced control files; and
a set of overrides;
wherein a JCL test scenario is created including test JCL libraries, test versions of referenced control files; and test parameter files.

15. An automated test JCL generation tool as recited in claim 14 wherein the plurality of referenced control files is referenced by the plurality of JCL programs.

16. An automated test JCL generation tool as recited in claim 15 wherein the plurality of referenced control files contain updatable control and history files.

17. An automated test JCL generation tool as recited in claim 14 further comprising a list of JCL program names corresponding to the plurality of JCL programs.

18. An automated test JCL generation tool as recited in claim 17 wherein the list of JCL program names is created from importing JCL program names from a JCL flow program.

19. An automated test JCL generation tool as recited in claim 14 further comprising JCL procedures contained in the list of procedure libraries used by the plurality of JCL programs.

20. An automated test JCL generation tool as recited in claim 14 wherein the plurality of external specifications further comprises a date value and a high-level qualifier.

21. An automated test JCL generation tool as recited in claim 20 wherein the plurality of external specifications further comprises library concatenation instructions related to the list of procedure libraries and a list of load module libraries.

22. An automated test JCL generation tool as recited in claim 14 wherein the set of overrides includes procedure symbolics and data set names.

23. An automated test JCL generation tool as recited in claim 14 further comprising a plurality of test versions of data files referenced by the JCL.

24. An automated test JCL generation tool as recited in claim 14 further comprising a plurality of test parameter files for storing parameter values passed to one or more procedures invoked by the plurality of JCL programs.

25. A method of automatically generating a test environment for testing job control language (JCL) programs in a batch computing environment, the method comprising:
creating a JCL program list containing names of JCL programs to be tested;
specifying custom characteristics of the test environment;
determining whether one or more JCL procedures invoked by the JCL programs need to be modified;
incorporating the custom characteristics into the JCL programs;
incorporating modifications to the one or more JCL procedures, thereby generating a test scenario in which JCL programs in a batch computing environment can be tested.

26. A method as recited in claim 25 further comprising incorporating a set of external characteristics into the JCL programs.

27. A method as recited in claim 25 wherein the set of external characteristics includes currency data and institutional-specific data.

28. A method as recited in claim 25 further comprising determining errors relating to data set names in the JCL programs and in the one or more JCL procedures.

29. A method as recited in claim 25 wherein creating a JCL program list further comprises importing JCL program names from a JCL program flow diagram.

30. A method as recited in claim 25 wherein incorporating modifications to the one or more JCL procedures further comprises:
reading the JCL programs;
identifying the one or more JCL procedures invoked by the JCL programs;
identifying symbolics in the one or more JCL procedures; and
overriding symbolics in the one or more JCL procedures.

31. A method as recited in claim 25 further comprising matching symbolics in the one or more JCL procedures with symbolics specified by a user.

32. A method as recited in claim 25 wherein incorporating the custom characteristics into the JCL programs further comprises reading library concatenations.

33. A method as recited in claim 25 further comprising overriding one or more variable names in the JCL programs.

* * * * *